United States Patent
Ahn

(10) Patent No.: US 6,721,308 B1
(45) Date of Patent: Apr. 13, 2004

(54) WAN ACCESS SYSTEM CAPABLE OF PERFORMING A LINE SWITCHING AND A PACKET SWITCHING

(75) Inventor: Jeong-Jun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 754 days.

(21) Appl. No.: 09/657,983

(22) Filed: Sep. 8, 2000

(30) Foreign Application Priority Data

Sep. 10, 1999 (KR) ........................................ 1999/38741

(51) Int. Cl.[7] ............................................... H04L 12/66
(52) U.S. Cl. ........................................ 370/356; 370/389
(58) Field of Search ................................. 370/351–358, 370/395.1, 395.52, 395.6, 395.61, 395.63, 395.64, 466, 467, 469, 493, 494, 495, 386

(56) References Cited

U.S. PATENT DOCUMENTS 6,577,623 B1 * 6/2003 Kawai et al. ............... 370/354

* cited by examiner

*Primary Examiner*—Wellington Chin
*Assistant Examiner*—Brenda Pham
(74) *Attorney, Agent, or Firm*—Fleshner & Kim, LLP

(57) ABSTRACT

The WAN access system has: a user connection process module section for converting analog signals to digital signals so as to process information in a switching system and processing a corresponding request of a user; a WAN connection process module section for selecting TDM buses so as to enable a line switching of a packet switching and extracting data to be transferred to an AAL1-processing/UTOPIA-multiplexing section; and a central control process module section for controlling the WAN access system, the central control process module section being connected to the user connection process module section and the WAN connection process module section to perform switching between the TDM buses, so as to enable the line switching and the packet switching, the central control process module section performing an AAL5 SAR processing and an SAAL processing, and an AAL1 processing and a UTOPIA bus multiplexing.

11 Claims, 4 Drawing Sheets

WAN ACCESS SYSTEM CAPABLE OF PERFORMING A LINE SWITCHING AND A PACKET SWITCHING

BACKGROUND OF THE INVENTION

1. Field of the Invention

The present invention relates to a wide area network (WAN) access system capable of performing a line switching and a packet switching, and more particularly to a WAN access system, in which a physical layer has a connection speed of the T1/E1 level, and a data layer above a physical layer can back up both the line switching and the packet switching.

2. Description of the Related Art

A WAN access system generally has a hardware, in which a specific physical layer backs up a service of a specific data layer. In this case, the physical layer has to realize different access systems according to whether the data exchanging method backed up by the data layer on a WAN protocol is a line switching method or a packet switching method, in a WAN access system having a corresponding physical layer of T1/E1 level, even though the physical layer is not changed, but is the same.

Especially, it is a noticeable tendency in recent times that, in the case of the same physical layer, the hardware of the system is not changed, but only the software in the system is changed, according to the data exchanging method in the data layer placed above the physical layer.

Meanwhile, in the case where the data layer backs up the line switching method, from the viewpoint of the hardware, the conventional WAN access system includes a user connection process module section 10 for processing requests of corresponding users, a central control process module section 20 for performing a general control process, and a WAN connection process module section 30 for performing a transfer, an extraction, and a conversion of data, as shown in FIG. 1.

The user connection process module section 10 includes an analog/digital connection section 11, a serial connection section 12, and a local area network (LAN) connection section 13. The analog/digital connection section 11 performs an analog connection with a telephone or a facsimile telegraph and a digital connection with a private switching system, that is, a private branch exchange (PBX). The serial connection section 12 processes a V.35 or recommended standard (RS)-449 interface, and the LAN connection section 13 performs a LAN connection.

The central control process module section 20 includes a time division multiplexing (TDM) switching section 21, a voice processing section 22, and a processor module section 23. The TDM switching section 21 performs a switching between TDM buses, and the voice processing section 22 performs compression/restoration of voice data transmitted/received through the analog/digital connection section 11. The processor module section 23 backs up a part of an asynchronous transfer mode (ATM) layer and controls all sections in respective module sections. In this case, the TDM bus means signals including a frame synchronous signal, a data clock signal, a transmission data signal, and a reception data signal.

The WAN connection process module section 30 includes a physical medium connection section 31 and a frame conversion section 32. The physical medium connection section 31 performs a physical medium connection with WAN, and the frame conversion section 32 converts a frame available in the physical layer into an electric signal or converts an electric signal received through the physical medium connection section 31 into frame data.

Hereinafter, described will be an operation of the conventional WAN access system having the construction as described above, in which the physical layer has a connection speed of T1/E1 level, and the line switching method used in, e.g., a public telephone network is utilized.

First, information or data processed by the analog/digital connection section 11 of the user connection process module section 10 are transferred through a first TDM bus, the TDM switching section 21 of the central control process module section 20, and a fourth TDM bus, to the frame conversion section 32 of the WAN connection process module section 30. Otherwise, the data are transferred to the voice processing section 22 through a third TDM bus by the TDM switching section 21 and then is voice-compressed, and thereafter are transferred through the fourth TDM bus to the frame conversion section 32 of the WAN connection process module section 30 and then are transmitted to the WAN through the physical medium connection section 31.

Data received through the serial connection section 12 and the LAN connection section 13 of the user connection process module section 10 are transferred respectively through a serial bus and a LAN interface to the processor module section 23 of the central control process module section 20. Then, data to be transmitted to the WAN are transferred through a second TDM bus, the TDM switching section 21, and the fourth TDM bus to the frame conversion section 32 of the WAN connection process module section 30, and then transmitted through the physical medium connection section 31 to the WAN.

On the contrary, data received through the frame conversion section 32 of the WAN connection process module section 30 are transferred to a corresponding user through a reverse process to the above process, in the WAN access system.

Meanwhile, in the case where the data layer uses a packet switching method, the hardware of the conventional WAN access system includes the processor module section 23 and a physical layer convergence protocol (PLCP) processing section 33, further to the hardware shown in FIG. 1, as shown in FIG. 2. In the following description, the same construction as in the hardware of FIG. 1 will be numbered the same and a description about the same construction will be omitted.

A segmentation and reassembly (SAR) processing section 24 is contained in the central control process module section 20 and performs a cell disassembling/assembling function of an ATM adaptation layer 1 (AAL1) and an AAL5. The PLCP processing section 33 is contained in the WAN connection process module section 30. The PLCP processing section 33 transforms data received through a universal-test-and-operation-physical-interface-for-ATM (UTOPIA) bus into a frame available in the physical layer and transfers it to the frame conversion section 32. Further, the PLCP processing section 33 extracts data to be transferred through the UTOPIA bus to the SAR processing section 24 of the central control process module section 20 from the frame in the physical layer received through the frame conversion section 32. In this case, the UTOPIA bus means signals including transmission/reception signals set as criteria for exchanging transmission/reception data between the physical layer and the data layer.

Hereinafter, described will be an operation of the conventional WAN access system having the construction as described above, in which the physical layer has a connection speed of T1/E1 level, and the packet switching method such as the ATM is utilized.

Data processed by the analog/digital connection section 11 of the user connection process module section 10 are transferred through the first TDM bus, the TDM switching section 21 of the central control process module section 20, and the second TDM bus, to the processor module section 23. Thereafter, the data are transformed into the mode of the AAL1 by the SAR processing section 24 and then transferred to the PLCP processing section 33 of the WAN connection process module section 30 by the UTOPIA bus, or the data are transferred through the third TDM to the voice processing section 22 by the TDM switching section 21 and voice-compressed, and then transferred through a host processor (HP) interface to the SAR processing section 24 and transformed into the mode of AAL5. Thereafter, the data are transferred through the UTOPIA bus to the PLCP processing section 33 of the WAN connection process module section 30. In this case, the HP interface means signals including the address/data bus for the data exchange between a processor of the processor module section 23 and an auxiliary processor of the voice processing section 22, and related control signals.

In the meantime, data received through the serial connection section 12 and the LAN connection section 13 of the user connection process module section 10 are transferred respectively through the serial bus and the LAN interface to the processor module section 23 of the central control process module section 20. Thereafter, data to be transmitted to the WAN are transformed into the mode of AAL5 by the SAR processing section 24 and then transferred through the UTOPIA bus to the PLCP processing section 33 of the WAN connection process module section 30. Then, the PLCP processing section 33 transforms the data received through the UTOPIA bus into a T1/E1 frame of the physical layer, and then transfers the data to the frame conversion section 32 through the fourth TDM bus, which is a local TDM bus, so that the data are transmitted through the physical medium connection section 31 to the WAN.

In the conventional WAN access system as described above, since a specific physical layer backs up a specific data layer, the conventional WAN access system has a deteriorated hardware flexibility. Further, there is a disadvantage in that the conventional WAN access system has to simultaneously change the hardware construction and the software or employ a new access system, according to a change of the WAN protocol used in the data layer.

SUMMARY OF THE INVENTION

Accordingly, the present invention has been made in an effort to solve the problems occurring in the related art, and it is an object of the present invention to provide a WAN access system capable of performing a line switching and a packet switching, in which data can be processed by modifying only the software without modifying the hardware construction, even when a data exchanging method, which is a WAN protocol used in a data layer above a physical layer, is changed, in the case where the connection speed of the physical layer is the T1/E1 level.

It is another object of the present invention to provide a WAN access system capable of performing a line switching and a packet switching, in which TDM buses, UTOPIA buses, and a processor bus capable of interfacing with the processor module section, are defined as internal interfaces of a WAN connection process module section, so that, even when the connection speed of a physical layer exceeds the T1/E1 level and a data layer is changed into a packet switching mode such as an ATM, the change can be easily coped with by modifying the WAN connection process module section.

In accordance with one aspect of the present invention, there is provided a WAN access system capable of performing a line switching and a packet switching, the WAN access system comprising: a user connection process module section for processing a corresponding request of users; a WAN connection process module section for performing transfer, extraction, and transformation of data; and a central control process module section for controlling the WAN access system, wherein the central control process module section comprises: a TDM switching section for performing switching between the TDM buses so as to enable the line switching and the packet switching; a voice processing section for performing compression/restoration for voice data transmitted/received; a processor module section for performing an AAL5 SAR processing and an SAAL processing and controlling a switching path for the TDM switching section; and an AAL1-processing/UTOPIA-multiplexing section for performing an AAL1 SAR processing and a UTOPIA bus multiplexing processing, and the WAN connection process module section comprises: a physical medium connection section for performing a physical medium connection; a frame conversion section for converting a frame available in a physical layer into an electric signal and converting an electric signal received through the physical medium connection section into frame data; a TDM selection section for selecting and processing a predetermined TDM bus according to a control of the processor module section; and a PLCP processing section for transforming data received through a second UTOPIA bus into a frame available in the physical layer and transferring the frame to the frame conversion section through the TDM selection section, the PLCP processing section extracting data to be transferred through the second UTOPIA bus to the AAL1-processing/UTOPIA-multiplexing section from the frame in the physical layer received through the frame conversion section.

In this case, a line switching TDM bus for transmission/reception of data is connected between the TDM switching section and the TDM selection section.

Further, when the data layer employs the packet switching method, the processor module section transforms data, which have been transferred to the voice processing section by the TDM switching section and voice-compressed, into AAL5 cells, and transforms data to be transmitted to a WAN, from among data transferred through a serial bus and a LAN interface from the user connection process module section, into AAL5 cells, and then transfers the AAL5 cells through a first UTOPIA bus to the AAL1-processing/UTOPIA-multiplexing section.

In addition, the AAL1-processing/UTOPIA-multiplexing section multiplexes the AAL5 cells, which have been received through the first UTOPIA bus, and the AAL1 cells, which have been transformed from the data transferred from the TDM switching section, and transfers the multiplexed cells through the second UTOPIA bus to the WAN connection process module section. The AAL1-processing/UTOPIA-multiplexing section performs a recombination of AAL1 cells, which have been extracted from the data transferred through the second UTOPIA bus from the WAN connection process module section, and then transfers the recombined cells through a TDM bus to the TDM switching section, and the AAL1-processing/UTOPIA-multiplexing section transfers the AAL5 cells through the first UTOPIA bus to the processor module section.

In accordance with another aspect of the present invention, there is provided a WAN access system capable of performing a line switching and a packet switching, the WAN access system comprising: a user connection process module section for processing a corresponding request of users; a WAN connection process module section for performing transfer, extraction, and transformation of data; and a central control process module section for controlling the WAN access system, wherein the central control process module section comprises: a TDM switching section for performing switching between the TDM buses so as to enable the line switching and the packet switching; a voice processing section for performing compression/restoration for voice data transmitted/received; and a processor module section for performing an AAL5 SAR processing and an SAAL processing and controlling a switching path for the TDM switching section, and the WAN connection process module section comprises: a physical medium connection section for performing a physical medium connection; a frame conversion section for converting a frame available in a physical layer into an electric signal and converting an electric signal received through the physical medium connection section into frame data; a TDM selection section for selecting and processing a predetermined TDM bus according to a control of the processor module section; an AAL1-processing/UTOPIA-multiplexing section for performing an AAL1 SAR processing and a UTOPIA bus multiplexing processing; and a PLCP processing section for transforming data received through a second UTOPIA bus into a frame available in the physical layer and transferring the frame to the frame conversion section through the TDM selection section, the PLCP processing section extracting data to be transferred through the second UTOPIA bus to the AAL1-processing/UTOPIA-multiplexing section from the frame in the physical layer received through the frame conversion section.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

The above and other objects, characteristics, and advantages of the present invention will become apparent from the following description along with the accompanying drawings.

Figure 1:
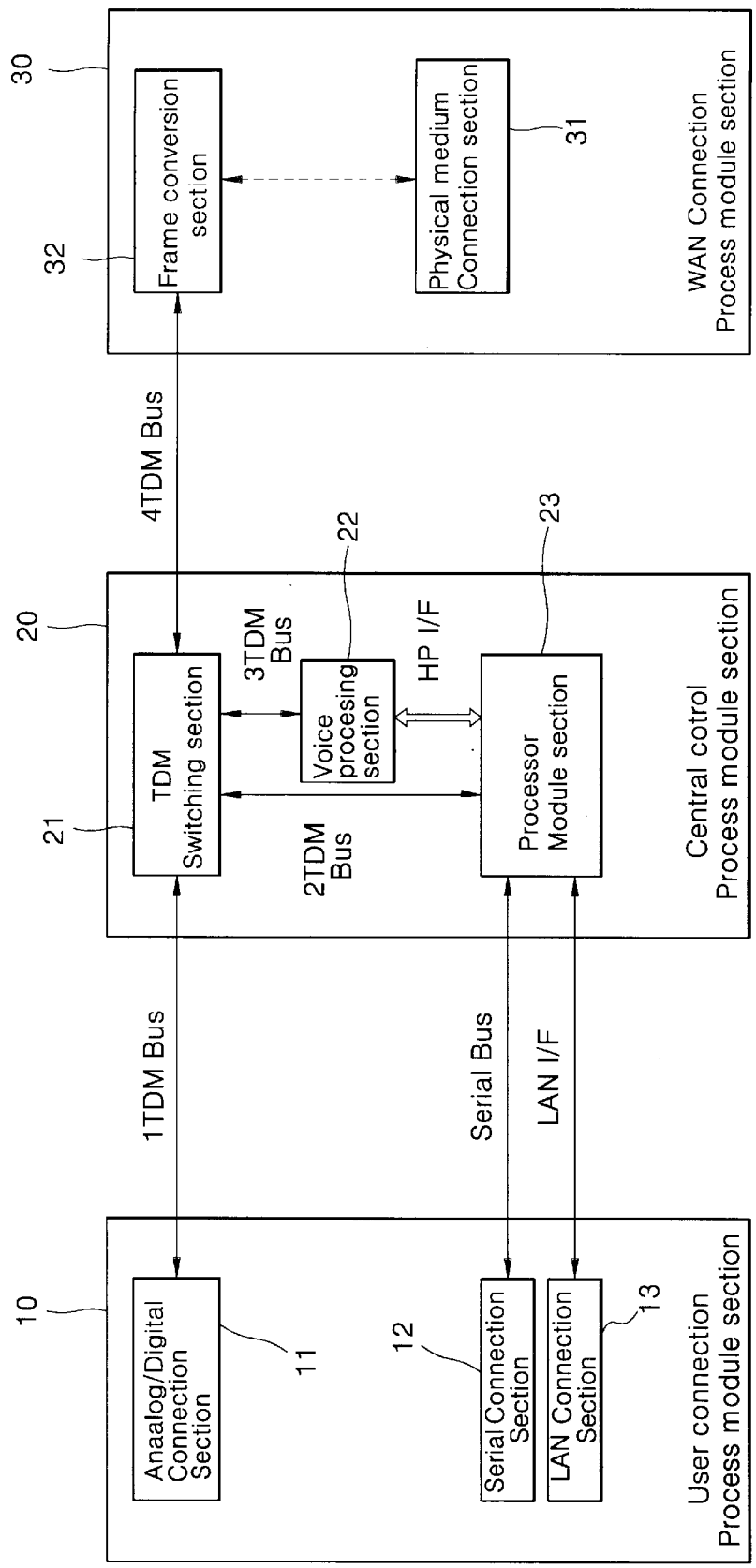
FIG. 1 is a schematic block diagram of a conventional WAN access system, in which a data layer backs up a line switching method.
Figure 2:
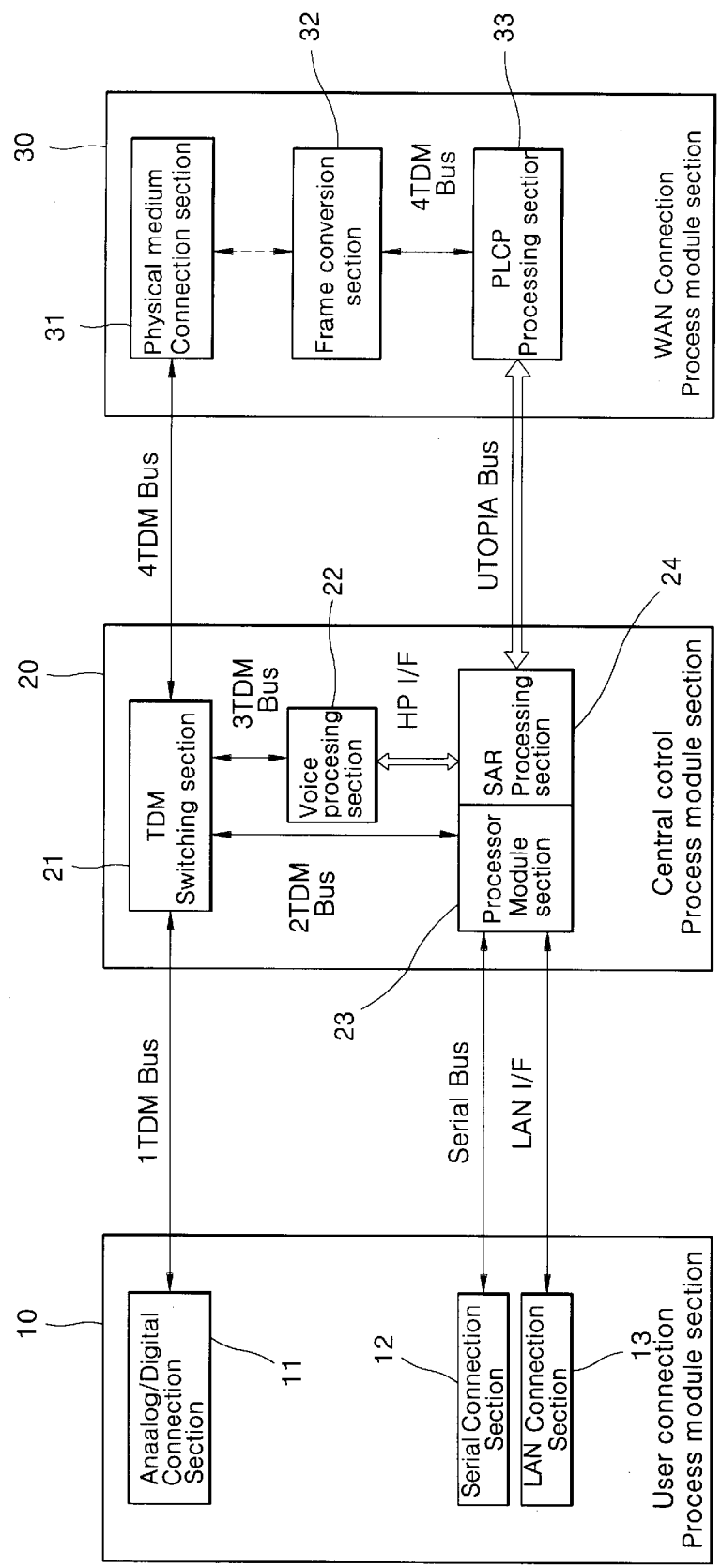
FIG. 2 is a schematic block diagram of another conventional WAN access system, in which a data layer backs up a packet switching method.
Figure 3:
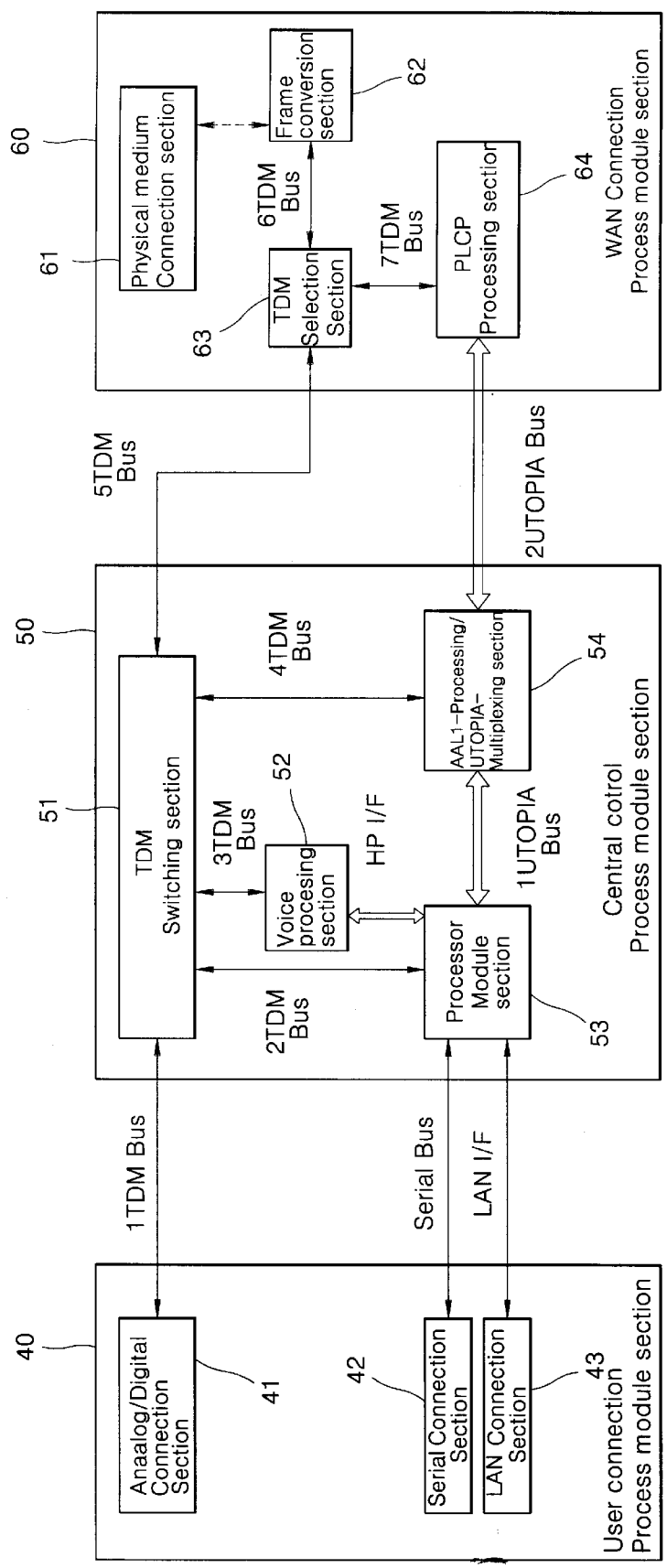
FIG. 3 is a schematic block diagram of a WAN access system capable of performing a line switching and a packet switching according to an embodiment of the present invention.

Referring to FIG. 3, a WAN access system capable of performing a line switching and a packet switching includes a user connection process module section 40, a central control process module section 50, and a WAN connection process module section 60.

The user connection process module section 40 includes an analog/digital connection section 41 for performing an analog connection with a telephone and a facsimile telegraph and a digital connection with a digital private switching system, a serial connection section 42 for processing V.35 or RS-449 interface, and a LAN connection section 43 for performing a LAN connection.

The central control process module section 50 includes a TDM switching section 51 for performing switching between TDM buses so as to enable the line switching and the packet switching, a voice processing section 52 for performing compression/restoration for voice data transmitted/received through the analog/digital connection section 41, a processor module section 53 for backing up a part of an ATM layer, performing a control for all sections in all module sections, and performing an AAL5 SAR processing and an SAAL processing, and an AAL1-processing/UTOPIA-multiplexing section 54 for performing an AAL1 SAR processing and a UTOPIA bus multiplexing processing.

The WAN connection process module section 60 includes a physical medium connection section 61 for performing a physical medium connection, a frame conversion section 62 for converting a frame available in the physical layer into an electric signal and converting an electric signal received through the physical medium connection section 61 into frame data, a TDM selection section 63 for selecting and processing a predetermined TDM bus according to a control of the processor module section 53, and a PLCP processing section 64 for transforming data received through a second UTOPIA bus into a frame available in the physical layer and transferring the frame to the frame conversion section 62 through the TDM selection section 63. Further, the PLCP processing section 64 extracts data to be transferred through the second UTOPIA bus to the AAL1-processing/UTOPIA-multiplexing section 54 of the central control process module section 50 from the frame in the physical layer received through the frame conversion section 62.

Hereinafter, described will be an operation of a WAN access system capable of performing a line switching and a packet switching according to the present invention as described above.

At first, described will be an operation of a WAN access system of the present invention employing the line switching method as in a public switched telephone network (PSTN).

Data processed by the analog/digital connection section 41 of the user connection process module section 40 are transferred through a first TDM bus, the TDM switching section 51 of the central control process module section 50, and a fifth TDM bus, to the TDM selection section 63 of the WAN connection process module section 60. Otherwise, the data are transferred through a third TDM bus to the voice processing section 52 by the TDM switching section 51 and then voice-compressed, and then transferred through a fifth TDM bus to the TDM selection section 63 of the WAN connection process module section 60.

Further, data received through the serial connection section 42 and the LAN connection section 43 of the user connection process module section 40 are transferred through a serial bus and a LAN interface to the processor module section 53 of the central control process module section 50. Thereafter, data to be transmitted to the WAN are transferred through a second TDM bus to the TDM switching section 51, and then transferred through the fifth TDM bus to the TDM selection section 63 of the WAN connection process module section 60.

In this case, the data transferred through the fifth TDM bus to the TDM selection section 63 of the WAN connection process module section 60 are not permitted to exceed a limited number of time slots, and are selected according to a control by the processor module section 53 of the central control process module section 50 and transferred through a sixth TDM bus to the frame conversion section 62, so as to be transmitted through the physical medium connection section 61 to the WAN. On the contrary, the data received through the frame conversion section 62 of the WAN connection process module section 60 from the WAN are transferred through the sixth TDM bus, the TDM selection section 63, and the fifth TDM bus, to the TDM switching section 51 of the central control process module section 50. Accordingly, the data transferred to the TDM switching section 51 are transferred through a corresponding TDM bus along a path set by the processor module section 53, as available data.

Next, described will be an operation of a WAN access system of the present invention employing the packet switching method as in a frame relay.

Data processed by the analog/digital connection section 41 of the user connection process module section 40 are transferred through the first TDM bus to the TDM switching section 51 of the central control process module section 50, and then are transferred through the third TDM bus to the voice processing section 52 by the TDM switching section 51 and voice-compressed. Thereafter, the data are transferred through the HP interface to the processor module section 53 and then transformed into a frame relay format in an aspect of the software. Furthermore, the data received through the serial connection section 42 and the LAN connection section 43 of the user connection process module section 40 are transferred respectively through the serial bus and the LAN interface to the processor module section 53 of the central control process module section 50, and then are transformed into a frame relay format.

Thereafter, data transformed into the frame relay format by the processor module section 53 are transferred through the second TDM bus to the TDM switching section 51, and then are transferred through the fifth TDM bus to the TDM selection section 63 of the WAN connection process module section 60 by the TDM switching section 51, so as to be transmitted to the WAN, as in the WAN access system employing the line switching method as described above. On the contrary, the data received through the frame conversion section 62 of the WAN connection process module section 60 from the WAN are transferred through the sixth TDM bus, the TDM selection section 63, and the fifth TDM bus, to the TDM switching section 51 of the central control process module section 50. Further, the data transferred to the TDM switching section 51 in the above way are transferred through the second TDM bus to the processor module section 53. Then, the data in a frame relay type are analyzed by the processor module section 53 in an aspect of the software, and then are transferred respectively through the serial bus and the LAN interface to the serial connection section 42 and the LAN connection section 43 and then to the user. The other data are transferred through the third TDM bus to the voice processing section 52 and voice-restored, and then transferred through the third TDM bus, the TDM switching section 51, and the first TDM bus, to the analog/digital connection section 41.

Finally, described will be an operation of a WAN access system of the present invention employing the packet switching method such as the ATM.

Data processed by the analog/digital connection section 41 of the user connection process module section 40 are transferred through the first TDM bus to the TDM switching section 51 of the central control process module section 50, and then transferred through the third TDM bus to the voice processing section 52 by the TDM switching section 51 and voice-compressed. Thereafter, the data are transformed into AAL5 cells by the processor module section 53 and then transferred through a first UTOPIA bus to the AAL1-processing/UTOPIA-multiplexing section 54, or the data are transferred through the fourth TDM bus to the AAL1-processing/UTOPIA-multiplexing section 54 by the TDM switching section 51 and then transformed into AAL1 cells. Further, the data received through the serial connection section 42 and the LAN connection section 43 of the user connection process module section 40 are transferred respectively through the serial bus and the LAN interface to the processor module section 53 of the central control process module section 50. Thereafter, the data to be transmitted to the WAN are transformed into AAL5 cells by the processor module section 53, and then are transferred through the first UTOPIA bus to the AAL1-processing/UTOPIA-multiplexing section 54. Then, the AAL1-processing/UTOPIA-multiplexing section 54 multiplexes the AAL5 cells received through the first UTOPIA bus and the AAL1 cells transformed from the data transferred through the fourth TDM bus, and transfers the multiplexed cells through the second UTOPIA bus to the PLCP processing section 64 of the WAN connection process module section 60. Then, the PLCP processing section 64 transforms the data received through the second UTOPIA bus into a T1/E1 frame of the physical layer, and then transfers the transformed frame through a seventh TDM bus, the TDM selection section 63, and the sixth TDM bus, to the frame conversion section 62, so that the frame is transmitted through the physical medium connection section 61 to the WAN. On the contrary, the data received through the frame conversion section 62 of the WAN connection process module section 60 from the WAN are transferred through the sixth TDM bus, the TDM selection section 63, and the seventh TDM bus, to the PLCP processing section 64, and then are transferred through the second UTOPIA bus to the AAL1-processing/UTOPIA-multiplexing section 54 of the central control process module section 50 by the PLCP processing section 64. Subsequently, the AAL1-processing/UTOPIA-multiplexing section 54 extracts AAL1 cells, and executes a recombination of the cells and transfers the recombined cells through the fourth TDM bus to the TDM switching section 51. The AAL5 cells, which are the other cells, are transferred through the first UTOPIA bus to the processor module section 53 by the AAL1-processing/UTOPIA-multiplexing section 54. Then, the processor module section 53 performs a cell-recombination for the AAL5 cells. Thereafter, data to be transferred to the serial connection section 42 and the LAN connection section 43 are transferred respectively through the serial bus and the LAN interface to the user, while the other data are transferred to the voice processing section 52 and voice-restored, and then transferred through the third TDM bus, the TDM switching section 51, and the first TDM bus, to the analog/digital connection section 41. Further, the TDM switching section 51 transfers the data, which have been transferred through the third TDM bus and the fifth TDM bus, to the analog/digital connection section 41 through the first TDM bus, which is a path defined by the processor module section 53.

Figure 4:
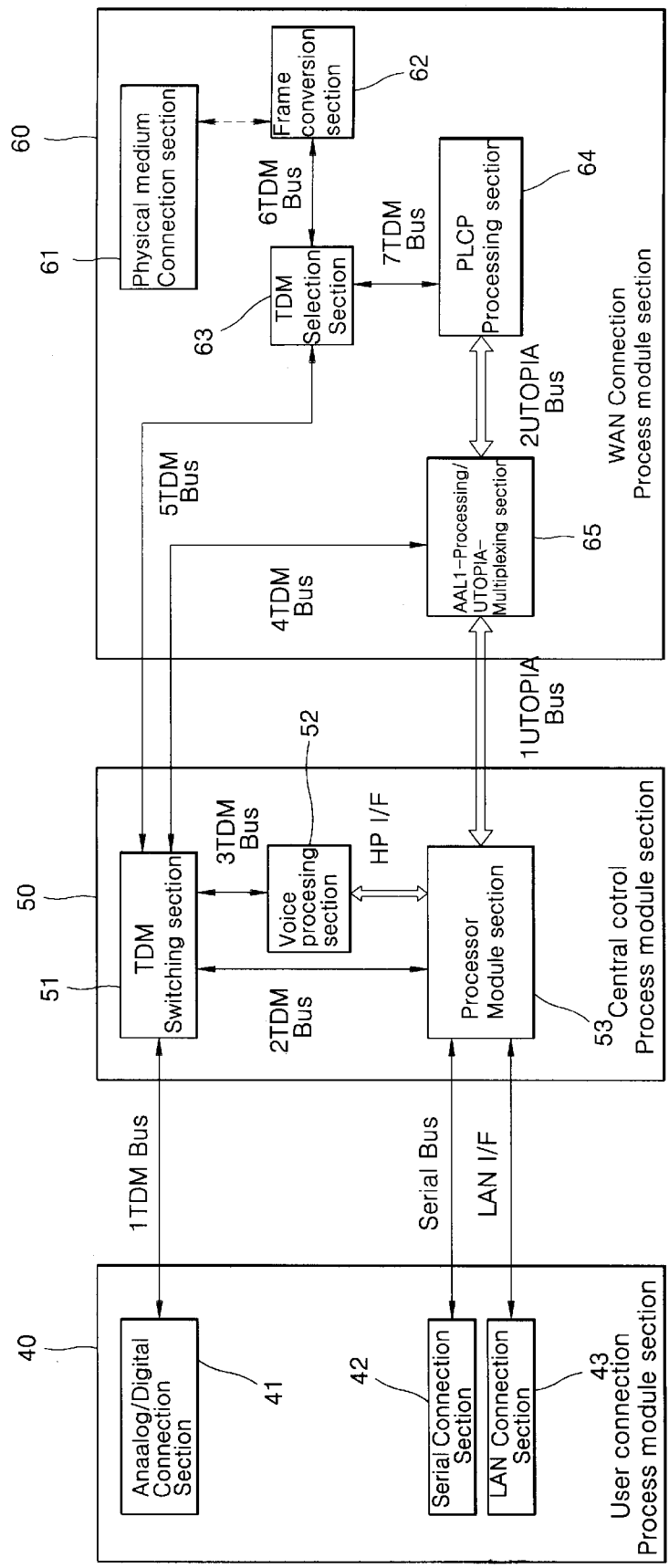
FIG. 4 is a schematic block diagram of a WAN access system capable of performing a line switching and a packet switching according to another embodiment of the present invention.

Meanwhile, FIG. 4 shows another WAN access system capable of performing a line switching and a packet switching according to another embodiment of the present invention, which has a construction nearly the same as that of the system shown in FIG. 3, excepting that an AAL1-processing/UTOPIA-multiplexing section 65 is contained in the WAN connection process module section 60 in the present embodiment, instead of the AAL1-processing/UTOPIA-multiplexing section 54 contained in the central control process module section 50 of the system shown in FIG. 3.

In the present embodiment, the hardware construction for the central control process module section 50 and the WAN connection process module section 60 of the WAN access system has to be modified in the case where the connection speed of the physical layer exceeds the T1/E1 level and the packet switching method such as the ATM is used, while it is sufficient to modify only the software without modifying the hardware construction in the case where the connection speed of the physical layer is the T1/E1 level.

In the WAN access system capable of performing a line switching and a packet switching according to the present invention as described above, in the case where the connection speed of the physical layer is the T1/E1 level, data can be processed by modifying only the software without modifying the hardware construction, even when a data exchanging method, which is a WAN protocol used in the data layer above the physical layer, is changed.

Further, in the WAN access system of the present invention, TDM buses, UTOPIA buses, and a processor bus capable of interfacing with the processor module section, are defined as the internal interfaces of the WAN connection process module section. Therefore, even when the connection speed of the physical layer exceeds the T1/E1 level and the data layer is changed into a packet switching mode such as an ATM, the change can be easily coped with by modifying the WAN connection process module section.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

What is claimed is:

1. A WAN access system capable of performing a line switching and a packet switching, the WAN access system comprising:
   a user connection process module section for converting analog signals to digital signals so as to process information in a switching system and processing a corresponding request of a user;
   a WAN connection process module section for selecting TDM buses so as to enable a line switching of a packet switching and extracting data to be transferred to an AAL1-processing/UTOPIA-multiplexing section; and
   a central control process module section for controlling the WAN access system, the central control process module section being connected to the user connection process module section and the WAN connection process module section to perform switching between the TDM buses, so as to enable the line switching and the packet switching, the central control process module section performing an AAL5 SAR processing and an SAAL processing, and an AAL1 processing and a UTOPIA bus multiplexing.

2. A WAN access system capable of performing a line switching and a packet switching as claimed in claim 1, wherein the central control process module section comprises:
   a TDM switching section for performing switching between the TDM buses so as to enable the line switching and the packet switching;
   a voice processing section for performing compression/restoration for voice data transmitted/received;
   a processor module section for performing an AAL5 SAR processing and an SAAL processing and controlling a switching path for the TDM switching section; and
   an AAL1-processing/UTOPIA-multiplexing section for performing an AAL1 SAR processing and a UTOPIA bus multiplexing processing.

3. A WAN access system capable of performing a line switching and a packet switching as claimed in claim 1, wherein the WAN connection process module section comprises:
   a physical medium connection section for performing a physical medium connection;
   a frame conversion section for converting a frame available in a physical layer into an electric signal and converting an electric signal received through the physical medium connection section into frame data;
   a TDM selection section for selecting and processing a predetermined TDM bus according to a control of the processor module section; and
   a PLCP processing section for transforming data received through a second UTOPIA bus into a frame available in the physical layer and transferring the frame to the frame conversion section through the TDM selection section, the PLCP processing section extracting data to be transferred through the second UTOPIA bus to the AAL1-processing/UTOPIA-multiplexing section from the frame in the physical layer received through the frame conversion section.

4. A WAN access system capable of performing a line switching and a packet switching as claimed in claim 2 or claim 3, wherein a line switching TDM bus for transmission/reception of data is connected between the TDM switching section and the TDM selection section.

5. A WAN access system capable of performing a line switching and a packet switching as claimed in claim 2, wherein, when the data layer employs the packet switching method, the processor module section transforms data, which have been transferred to the voice processing section by the TDM switching section and voice-compressed, into AAL5 cells, and transforms data to be transmitted to a WAN, from among data transferred through a serial bus and a LAN interface from the user connection process module section, into AAL5 cells, and then transfers the AAL5 cells through a first UTOPIA bus to the AAL1-processing/UTOPIA-multiplexing section.

6. A WAN access system capable of performing a line switching and a packet switching as claimed in claim 2, wherein the AAL1-processing/UTOPIA-multiplexing section multiplexes the AAL5 cells, which have been received through the first UTOPIA bus, and the AAL1 cells, which have been transformed from the data transferred from the TDM switching section, and transfers the multiplexed cells through the second UTOPIA bus to the WAN connection process module section.

7. A WAN access system capable of performing a line switching and a packet switching as claimed in claim 2, wherein the AAL1-processing/UTOPIA-multiplexing section performs a recombination of AAL1 cells, which have been extracted from the data transferred through the second UTOPIA bus from the WAN connection process module section, and then transfers the recombined cells through a TDM bus to the TDM switching section, and the AAL1-processing/UTOPIA-multiplexing section transfers the AAL5 cells through the first UTOPIA bus to the processor module section.

8. A WAN access system capable of performing a line switching and a packet switching, the WAN access system comprising:

a user connection process module section for processing a corresponding request of users;

a WAN connection process module section for performing transfer, extraction, and transformation of data; and a central control process module section for controlling the WAN access system, wherein the central control process module section comprises:
 a TDM switching section for performing switching between the TDM buses so as to enable the line switching and the packet switching;
 a voice processing section for performing compression/ restoration for voice data transmitted/received; and
 a processor module section for performing an AAL5 SAR processing and an SAAL processing and controlling a switching path for the TDM switching section, and the WAN connection process module section comprises:
 a physical medium connection section for performing a physical medium connection;
 a frame conversion section for converting a frame available in a physical layer into an electric signal and converting an electric signal received through the physical medium connection section into frame data;
 a TDM selection section for selecting and processing a predetermined TDM bus according to a control of the processor module section;
 an AAL1-processing/UTOPIA-multiplexing section for performing an AAL1 SAR processing and a UTOPIA bus multiplexing processing; and
 a PLCP processing section for transforming data received through a second UTOPIA bus into a frame available in the physical layer and transferring the frame to the frame conversion section through the TDM selection section, the PLCP processing section extracting data to be transferred through the second UTOPIA bus to the AAL1-processing/UTOPIA-multiplexing section from the frame in the physical layer received through the frame conversion section.

9. A WAN access system capable of performing a line switching and a packet switching as claimed in claim 8, wherein, when the data layer employs the packet switching method, the processor module section transforms data, which have been transferred to the voice processing section by the TDM switching section and voice-compressed, into AAL5 cells, and transforms data to be transmitted to the WAN connection module section, from among data transferred through a serial bus and a LAN interface from the user connection process module section, into AAL5 cells, and then transfers the AAL5 cells through a first UTOPIA bus to the AAL1-processing/UTOPIA-multiplexing section.

10. A WAN access system capable of performing a line switching and a packet switching as claimed in claim 2, wherein the AAL1-processing/UTOPIA-multiplexing section multiplexes the AAL5 cells, which have been received through the first UTOPIA bus from the processor module section, and the AAL1 cells, which have been transformed from the data transferred from the TDM switching section, and transfers the multiplexed cells through the second UTOPIA bus to the PLCP processing section.

11. A WAN access system capable of performing a line switching and a packet switching as claimed in claim 2, wherein the AAL1-processing/UTOPIA-multiplexing section performs a recombination of AAL1 cells, which have been extracted from the data transferred through the second UTOPIA bus from the PLCP processing section, and then transfers the recombined cells through a TDM bus to the TDM switching section, and the AAL1-processing/ UTOPIA-multiplexing section transfers the AAL5 cells through the first UTOPIA bus to the processor module section of the central control process module section.

* * * * *